Aug. 5, 1958    N. F. NICKLES    2,846,261
GAS TANK FILLER DOOR
Filed Jan. 17, 1955
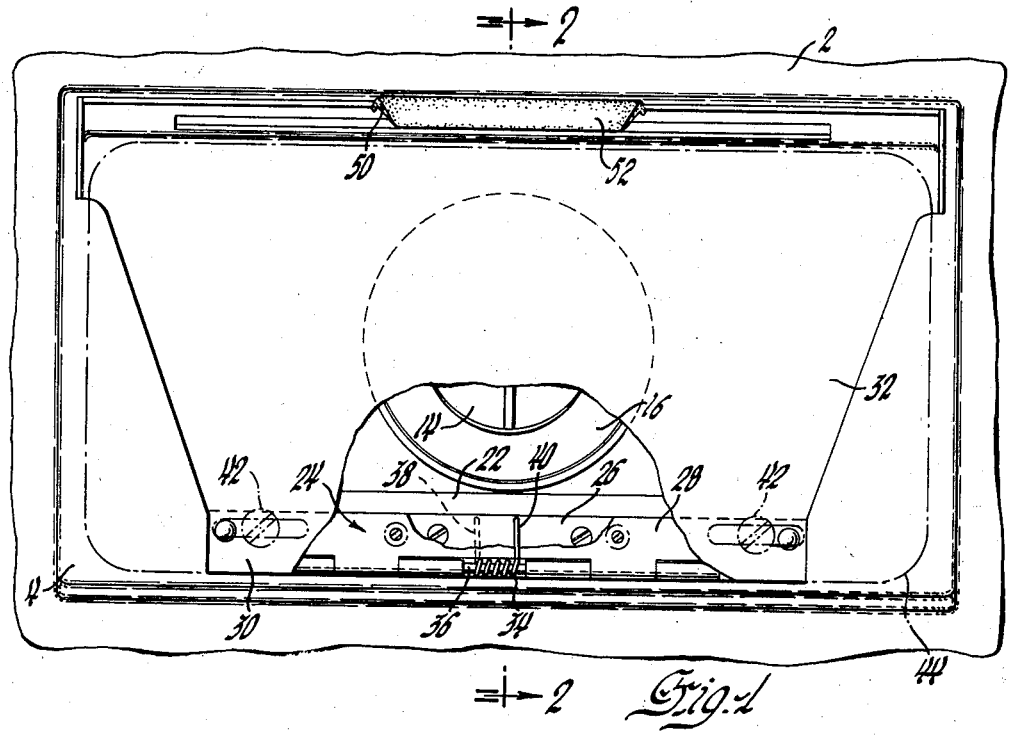
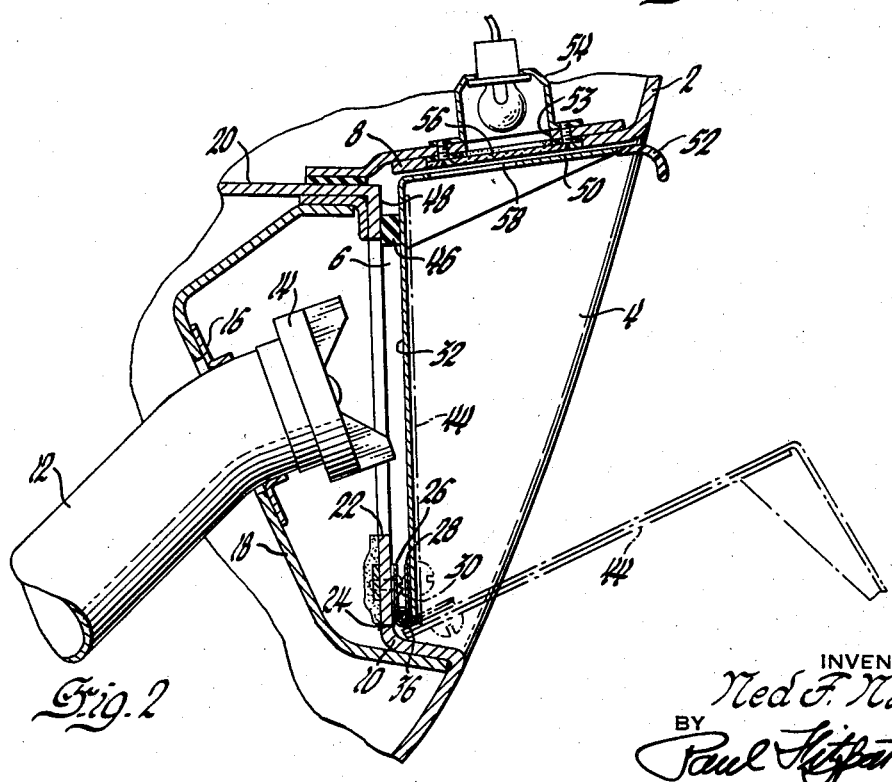
INVENTOR
Ned F. Nickles
BY
Paul Fitzpatrick

United States Patent Office 2,846,261
Patented Aug. 5, 1958

2,846,261

GAS TANK FILLER DOOR

Ned F. Nickles, Detroit, Mich., assignor to General Motors Corporation, Detroit, Mich., a corporation of Delaware Application January 17, 1955, Serial No. 482,107

5 Claims. (Cl. 296—1)

This invention relates to vehicle body structure and more particularly to a resiliently biased closure construction adapted to cooperate with the body structure to conceal a vehicle gas tank filler neck assembly disposed in recessed relation to the vehicle body surface.

It has been proposed in the past to mount a vehicle license plate in a manner partially covering the gas tank filler neck and cap assembly. However, in previous constructions, the license plate mounting frame has been arranged in spaced relation from the outer surface of the vehicle body sufficiently to permit accidental snagging or damage. In addition, such arrangement tended to detract from the otherwise smooth body contour typical of modern automotive vehicles.

An object of the present invention is to provide a hinged license plate mounting bracket arranged in a manner permitting the gas tank filler neck assembly to be totally masked, the entire assembly being recessed in a surrounding depression formed in the vehicle body wall.

Another object is to provide a device of the stated character having means provided thereon for yieldably maintaining the license plate in a vertically disposed position providing optimum visibility from the rear of the vehicle.

A further object is to provide, in a construction of the type described, a source of light disposed in a position in the vehicle body providing illumination for the license plate when the latter is in the normal position and for the gas tank filler neck assembly when the license plate is in the displaced position.

Still a further object is to provide a hinged license plate and mounting structure of the type described having a hand engaging portion arranged to permit easy displacement from the recessed position for access to the gas tank filler neck.

These and other objects and advantages of the invention will become more fully apparent as reference is had to the accompanying specification and drawing wherein:

Fig. 1 is a rear elevational view of a portion of a vehicle body illustrating the form and arrangement of the present invention; and Fig. 2 is a side elevational view, partly in section, of a portion of the vehicle body and hinged frame construction shown in Fig. 1, the hinged frame being shown in both solid and dotted lines to illustrate the open and closed positions thereof.

Referring now to the drawings, the reference numeral 2 indicates generally the rear transverse body wall of a vehicle. Substantially transversely midway thereof body wall 2 is provided with a transversely extending rectangular forwardly displaced portion 4 which forms a continuation of the body wall surface. Depressed portion 4 terminates in a rectangular aperture 6 which is disposed in a generally vertical plane. Because of the rearward and upward inclination of body wall 2, the depth of wall portions 8 and 10, forming respectively the upper and lower walls of depressed portion 4, are unequal. However, it will be understood that the cross-sectional configuration of the depressed portion 4 is dictated entirely by body surface inclination adjacent thereto and may be of any form required.

As seen best in Fig. 2, aperture 6 formed at the rear wall of depressed portion 4 is longitudinally aligned with a gas tank filler neck 12 and gas tank cap 14 associated therewith. Filler neck 12 extends diagonally upwardly through a flanged washer 16 which is secured to a generally C-shaped supporting bracket 18. Bracket 18, in turn, is secured at its lower end to the lower wall 10 of depressed portion 4 and its upper end to the lower surface of vehicle body floor 20.

Extending transversely along the vertically extending terminal edge 22 of wall portion 10 is a piano-type hinge 24. One half 26 of hinge 24 is bolted at spaced intervals to portion 22 while the other half 28 of the hinge is connected by bolts to the lower edge 30 of a generally rectangular license plate frame structure 32. Transversely midway of hinge structure 24, a coil spring element 34 surrounds the hinge pin 36 and is provided with leg portions 38 and 40 which are arranged to yieldably bias the hinge and frame structure in a counterclockwise direction, as seen in Fig. 2. At its opposite ends the outer half 28 of hinge 24 is adapted for threaded connection with machine screws 42 by means of which a conventional vehicle license plate 44 is secured thereto. In order to provide silent closing and freedom from rattling between the closure and vehicle body, rubber buffer elements 46 may be disposed at spaced intervals along the rear upper edge of the frame 32. Thus, when frame 32 is in the closed vertically extending position illustrated in Fig. 2, buffer elements 46 yieldably engage the downturned edge 48 of vehicle body floor 20 and prevent metal to metal contact.

In order to permit easy withdrawal of the frame and license plate assembly from its substantially recessed position in depressed portion 4, the upper edge of frame 32 is formed with an integral rearwardly extending tab portion 50 having a downwardly curved terminal edge 52 providing a finger engaging portion. Since the rearwardly extending portion 50 normally lies in flush relation with the inner surface of wall 8 of depressed portion 4, it will, of course, permit unobstructed view of the license plate in its normal position, yet allow ready displacement of the frame and license plate assembly in a clockwise direction for access to the filler neck and cap assembly disposed therebehind.

In accordance with another feature of the invention, upper wall 8 of recessed portion 4 is formed with a rectangular aperture 53 which communicates with a light bulb and socket assembly 54. Socket assembly 54 is secured on the upper surface of wall 8 and is connected to a source of current, not shown. A transparent lens structure 56 is secured in aperture 53 of wall 8 to direct transmission of light downwardly and forwardly from assembly 54. To accomplish illumination of the license plate numerals when the latter is in the normal vertically extending position, the rearwardly extending portion 50 is formed with a generally rectangular opening 58 which is aligned with the angle of emission of light rays from lens 56 toward the surface of license plate 44. However, when the license plate and frame assembly are temporarily yieldably displaced to the position shown in dotted lines (Fig. 2) to gain access to the gas tank cap, lens 56 direct illumination downwardly and forwardly in recessed portion 4 and adjacent filler neck and cap structure, thus facilitating filling of the vehicle gas tank under conditions of adverse exterior illumination.

While but one embodiment of the invention has been shown and described, it will be understood that numerous changes and modifications may be made therein. It is, therefore, to be understood that it is not intended to limit

I claim:

1. In combination with a vehicle body having a recess formed therein, means forming an opening in said recess, a gas tank filler neck disposed adjacent said opening, a frame structure hinged on a transverse axis for angular movement in and out of said recess, means biasing said frame to a substantially vertical position in said recess, resilient stop means carried by said frame for arresting inward angular movement thereof, means on said frame for manually displacing the same to a position exposing said filler neck, and illuminating means disposed in said body and arranged to provide a source of light directed into the interior of said recess.

2. In an automotive vehicle, a vehicle body having a rectangular depressed portion formed therein substantially transversely midway of the rear surface thereof, a gas tank filler neck assembly disposed adjacent said depressed portion, means forming an opening in the forward wall of said portion longitudinally aligned with said filler neck, a frame structure hinged on a transverse axis longitudinally midway of said depressed portion for angular movement in and out of said recess, said frame being adapted to support a vehicle license plate, spring means arranged to urge said frame and license plate angularly to a substantially vertical position within said depressed portion, resilient stop means carried on the forwardly facing surface of said frame, said stop means being adapted to abut the forward wall of said depressed portion to prevent rattling of said frame, a vehicle lamp assembly secured in a wall of said depressed portion, and a lens element secured in said last mentioned wall adjacent said lamp, said lens being arranged to direct illumination forwardly and downwardly across the surface of said license plate when the latter is in the normal vertical position.

3. In an automotive vehicle, a vehicle body having a recess formed therein substantially transversely midway of the rear surface thereof, a gas tank filler neck assembly disposed adjacent said recess, means forming an opening in said recess longitudinally aligned with said filler neck, a frame structure hinged on a transverse axis longitudinally midway of said recess for angular movement in and out of said recess, said frame being adapted to support a vehicle license plate, spring means arranged to urge said frame and license plate angularly to a substantially vertical position within said recess, resilient stop means carried by said frame, said stop means being adapted to abut a portion of said recess to prevent rattling of said frame resulting from vibration, a vehicle lamp assembly secured in a wall of said recess, a lens element secured in said wall adjacent said lamp assembly, said lens being adapted to direct illumination forwardly and downwardly across the surface of said license plate, a finger engaging portion on said frame extending rearwardly therefrom, said engaging means normally lying in flush relation over said lens, and means forming an aperture in said finger engaging portion permitting transmission of light from said lens to the surface of said license plate.

4. In an automotive vehicle, a vehicle body having a recess formed therein substantially transversely midway of the rear surface thereof, a gas tank filler neck assembly disposed adjacent said recess, means forming an opening in said recess longitudinally aligned with said filler neck, a frame structure hinged on a transverse axis longitudinally midway of said recess for angular movement in and out of said recess, said frame being adapted to support a vehicle license plate, spring means arranged to urge said frame and license plate angularly to a substantially vertical position within said recess, resilient stop means carried by said frame, said stop means being adapted to abut a portion of said recess to prevent rattling of said frame, a lamp assembly connected to a wall of said recess, a lens element secured in said wall adjacent said bulb, said lens being adapted to direct illumination forwardly and downwardly across the surface of said license plate, finger engaging means on said frame extending rearwardly therefrom, said engaging means normally lying in flush relation over said lens, and means forming an aperture in said finger engaging portion permitting transmission of light from said lens to the surface of said license plate, said aperture being forwardly offset relative to said lens to occupy a position in alignment with the angularly directed rays of light from said lens.

5. In a vehicle body, means forming a recessed portion in said body, a gas tank filler neck assembly disposed adjacent said recessed portion in longitudinal alignment therewith, means forming a communicating passage between said recess and said filler neck assembly, a license plate and frame assembly hinged on a transverse axis in said recess for movement from a generally vertical filler neck concealing position to a generally horizontal filler neck exposing position, spring means urging said assembly to said vertical position and means for illuminating said license plate, said last mentioned means being located in said body in a position providing direct illumination on said filler neck assembly when said license plate and frame structure is temporarily displaced to the filler neck assembly exposing position.

References Cited in the file of this patent

UNITED STATES PATENTS

| | | |
|---|---|---|
| 2,104,539 | Hacker | Jan. 4, 1938 |
| 2,314,326 | Cadwallader | Mar. 23, 1943 |
| 2,575,211 | Flacke | Nov. 23, 1951 |
| 2,708,594 | MacPherson | May 17, 1955 |

FOREIGN PATENTS

| | | |
|---|---|---|
| 333,219 | Italy | Dec. 23, 1935 |